(12) United States Patent
Shojima

(10) Patent No.: US 11,618,482 B2
(45) Date of Patent: Apr. 4, 2023

(54) STATE DETERMINATION DEVICE, DRIVING SUPPORT DEVICE, STATE DETERMINATION METHOD, AND DRIVING SUPPORT METHOD

(71) Applicant: CLARION CO., LTD., Saitama (JP)

(72) Inventor: Hiroshi Shojima, Saitama (JP)

(73) Assignee: CLARION CO., LTD., Saitama (JP)

(*) Notice: Subject to any disclaimer, the term of this patent is extended or adjusted under 35 U.S.C. 154(b) by 191 days.

(21) Appl. No.: 17/049,716

(22) PCT Filed: Nov. 30, 2018

(86) PCT No.: PCT/JP2018/044139
§ 371 (c)(1),
(2) Date: Oct. 22, 2020

(87) PCT Pub. No.: WO2019/230020
PCT Pub. Date: Dec. 5, 2019

(65) Prior Publication Data
US 2021/0039678 A1 Feb. 11, 2021

(30) Foreign Application Priority Data
Jun. 1, 2018 (JP) .............................. JP2018-106396

(51) Int. Cl.
*B60W 60/00* (2020.01)
*B60W 40/08* (2012.01)

(52) U.S. Cl.
CPC ........ *B60W 60/0051* (2020.02); *B60W 40/08* (2013.01); *B60W 60/0059* (2020.02);
(Continued)

(58) Field of Classification Search
CPC ........... B60W 60/0051; B60W 50/082; B60W 60/0059; B60W 2540/225; B60W 2040/0818
See application file for complete search history.

(56) References Cited

U.S. PATENT DOCUMENTS

2007/0089054 A1* 4/2007 Morimoto ................ B60Q 9/00
715/700
2017/0282935 A1 10/2017 Fujimoto et al.
(Continued)

FOREIGN PATENT DOCUMENTS

EP     1 769 969 A2   4/2007
JP     2002-025000 A   1/2002
(Continued)

OTHER PUBLICATIONS

International Preliminary Report on Patentability of PCT Application No. PCT/JP2018/044139 dated Dec. 10, 2020.
(Continued)

*Primary Examiner* — Alan D Hutchinson
*Assistant Examiner* — Andy Schneider
(74) *Attorney, Agent, or Firm* — IP Business Solutions, LLC

(57) ABSTRACT

To determine whether a driver's state is suitable state for driving.
A vehicle-mounted device 10 includes: a traveling support control unit 30 that senses that the driver is provided with guidance regarding the driving operation; a line-of-sight detection unit 32 that detects the direction of a driver's line-of-sight; a condition determination unit 33 that determines whether a gaze condition is satisfied, the gaze condition including: that, with respect to a preset gaze direction, the driver's line-of-sight faces the gaze direction until a first reference time elapses from when guidance is sensed; and that time during which the driver's line-of-sight faces the gaze direction is equal to or longer than a second reference time; and a driver state determination unit 34 that determines whether the driver is in a state of being able to drive based on the determination result of the condition determination unit 33.

9 Claims, 6 Drawing Sheets

(52) U.S. Cl.
CPC ..... *B60W 2510/20* (2013.01); *B60W 2540/10* (2013.01); *B60W 2540/225* (2020.02)

(56) References Cited

U.S. PATENT DOCUMENTS

| | | | |
|---|---|---|---|
| 2017/0364070 A1 | 12/2017 | Oba | |
| 2018/0113454 A1* | 4/2018 | Emura | B60W 50/14 |
| 2018/0148071 A1 | 5/2018 | Kim | |
| 2019/0271981 A1 | 9/2019 | Oba | |
| 2020/0017118 A1* | 1/2020 | Miyahara | B60W 50/14 |

FOREIGN PATENT DOCUMENTS

| | | |
|---|---|---|
| JP | 2004-070795 A | 3/2004 |
| JP | 2007-094618 A | 4/2007 |
| JP | 2016-115356 A | 6/2016 |
| JP | 2017-178009 A | 10/2017 |
| JP | 2018-92318 A | 6/2018 |
| WO | 2016/199379 A1 | 12/2016 |
| WO | 2018/066023 A1 | 4/2018 |

OTHER PUBLICATIONS

Written Opinion of the International Searching Authority of PCT Application No. PCT/JP2018/044139 dated Jan. 22, 2019.
Extended European Search Report mailed by European Patent Office dated Feb. 8, 2022 in corresponding European patent application No. 18920444.9-1012.
Japanese Office Action mailed by Japanese Patent Office dated Apr. 19, 2022 in corresponding Japanese patent application No. 2018-106396.
International Search Report of PCT/JP2018/044139 dated Jan. 22, 2019.
Written Opinion of the International Searching Authority of PCT/JP2018/044139 dated Jan. 22, 2019.
Japanese Office Action mailed by Japanese Patent Office dated Nov. 30, 2021 in corresponding Japanese patent application No. 2018-106396.

* cited by examiner

STATE DETERMINATION DEVICE, DRIVING SUPPORT DEVICE, STATE DETERMINATION METHOD, AND DRIVING SUPPORT METHOD

TECHNICAL FIELD

The present invention relates to a state determination device, a driving support device, a state determination method, and a driving support method.

BACKGROUND ART

Conventionally, a device that senses a driver's awakening state is known (see, for example, Patent Literature 1). The device described in Patent Literature 1 has the driver operate a shift pad mounted on a steering wheel in a predetermined manner to sense the driver's awakening.

CITATION LIST

Patent Literature

Patent Literature 1

Japanese Patent Laid-Open No. 2017-178009

SUMMARY OF INVENTION

Technical Problem

However, even when the driver is in a state of awakening, the driver is not necessarily in a state of being able to drive. The conventional art cannot determine whether the driver is in a state of being able to drive.

An object of the present invention is to determine whether the driver's state is a state suitable for driving.

Solution to Problem

The description herein incorporates Japanese Patent Application No. 2018-106396 filed on Jun. 1, 2018, in its entirety.

In order to solve the above problems, an aspect of the present invention is a state determination device for determining a state of a vehicle driver, the state determination device including: a guidance sensing unit that senses that guidance regarding driving operation has been provided to the driver; a line-of-sight detection unit that detects a direction of the driver's line-of-sight; a condition determination unit that determines whether a gaze condition is satisfied, the gaze condition including: that, with respect to a preset gaze direction, the driver's line-of-sight faces the gaze direction until a first reference time elapses from when guidance is sensed by the guidance sensing unit; and that time during which the driver's line-of-sight faces the gaze direction is equal to or longer than a second reference time; and a driver state determination unit that determines whether the driver is in a state of being able to drive based on the determination result of the condition determination unit.

Further, in the above configuration, the driver state determination unit may determine that the driver is in a state of being able to drive when a plurality of the gaze directions are set as targets of determination and the gaze condition is determined to be satisfied with respect to all the gaze directions that have been set.

Further, in the above configuration, the gaze direction with respect to which the driver state determination unit makes determination may be set corresponding to a traveling state of the vehicle.

Further, in the above configuration, the second reference time may be set corresponding to the gaze direction and the traveling state of the vehicle.

Further, the above configuration may include: a storage unit that stores condition data that determines the gaze direction and the second reference time in association with the traveling state of the vehicle; and a traveling state determination unit that determines the traveling state of the vehicle, wherein the condition determination unit and the driver state determination unit make determination based on the condition data stored in the storage unit in association with the traveling state determined by the traveling state determination unit.

Further, the above configuration may include: a surrounding condition sensing unit that senses a situation around the vehicle; and an input unit that receives input from the driver, wherein the driver state determination unit determines that the driver is in a state of being able to drive when the gaze condition is determined to be satisfied with respect to the gaze direction and input received by the input unit corresponds to the sensed result of the surrounding condition sensing unit.

Further, in the above configuration, the line-of-sight detection unit may identify the line-of-sight direction by detecting the line-of-sight direction or face direction of the driver.

Further, in the above configuration, the guidance sensing unit may sense a voice or display guidance for driving start to the driver.

Further, in order to solve the above problems, a driving support device of another aspect of the present invention includes: an automatic driving control unit that controls traveling of a vehicle; a driving mode control unit that switches between an automatic driving mode in which the automatic driving control unit performs traveling control and a manual driving mode in which a driver's operation causes the vehicle to travel; a guidance sensing unit that senses that guidance regarding driving operation has been provided to the driver; a line-of-sight detection unit that detects a direction of the driver's line-of-sight; a condition determination unit that determines whether a gaze condition is satisfied, the gaze condition including: that, with respect to a preset gaze direction, the driver's line-of-sight faces the gaze direction until a first reference time elapses from when guidance is sensed by the guidance sensing unit; and that time during which the driver's line-of-sight faces the gaze direction is equal to or longer than a second reference time; and a driver state determination unit that determines whether the driver is in a state of being able to drive based on the determination result of the condition determination unit, wherein the driving mode control unit switches to the manual driving mode when the driver state determination unit determines that the driver is in a state of being able to drive in the automatic driving mode.

In order to solve the above problems, a state determination method of yet another aspect of the present invention is a state determination method for determining a state of a vehicle driver, the state determination method including: a guidance sensing step that senses that guidance regarding driving operation has been provided to the driver; a line-of-sight detection step that detects the direction of the driver's line-of-sight, a condition determination step that determines whether a gaze condition is satisfied, the gaze condition including: that, with respect to a preset gaze direction, the driver's line-of-sight faces the gaze direction until a first reference time elapses from when guidance is sensed by the guidance sensing step; and that time during which the driver's line-of-sight faces the gaze direction is equal to or longer than a second reference time; and a driver state determination step that determines whether the driver is in a state of being able to drive based on the determination result of the condition determination step.

Further, in order to solve the above problems, the driving support method of yet another aspect of the present invention is a driving support method, the method being performed by a vehicle including an automatic driving control unit that controls traveling of a vehicle, the vehicle capable of switching between an automatic driving mode in which the automatic driving control unit performs traveling control and a manual driving mode in which a driver's operation causes the vehicle to travel, wherein: state determination is executed, the state determination including a guidance sensing step that senses that guidance regarding driving operation has been provided to the driver, a line-of-sight detection step that detects a direction of the driver's line-of-sight, a condition determination step that determines whether a gaze condition is satisfied, the gaze condition including that, with respect to a preset gaze direction, the driver's line-of-sight faces the gaze direction until a first reference time elapses from when guidance is sensed by the guidance sensing step, and that time during which the driver's line-of-sight faces the gaze direction is equal to or longer than a second reference time, and a driver state determination step that determines whether the driver is in a state of being able to drive based on the determination result of the condition determination step; and when the state determination determines that the driver is in a state of being able to drive, a state of driving operation including steering wheel operation and accelerator operation by the driver is sensed, and switching to the manual driving mode is performed based on the sensed result of the state of driving operation.

Advantageous Effect of Invention

According to the aspects of the present invention, it is possible to determine whether the driver's state is suitable for driving based on the driver's line-of-sight.

DESCRIPTION OF EMBODIMENTS

First Embodiment

Embodiments of the present invention is described below with reference to the drawings.

Figure 1:
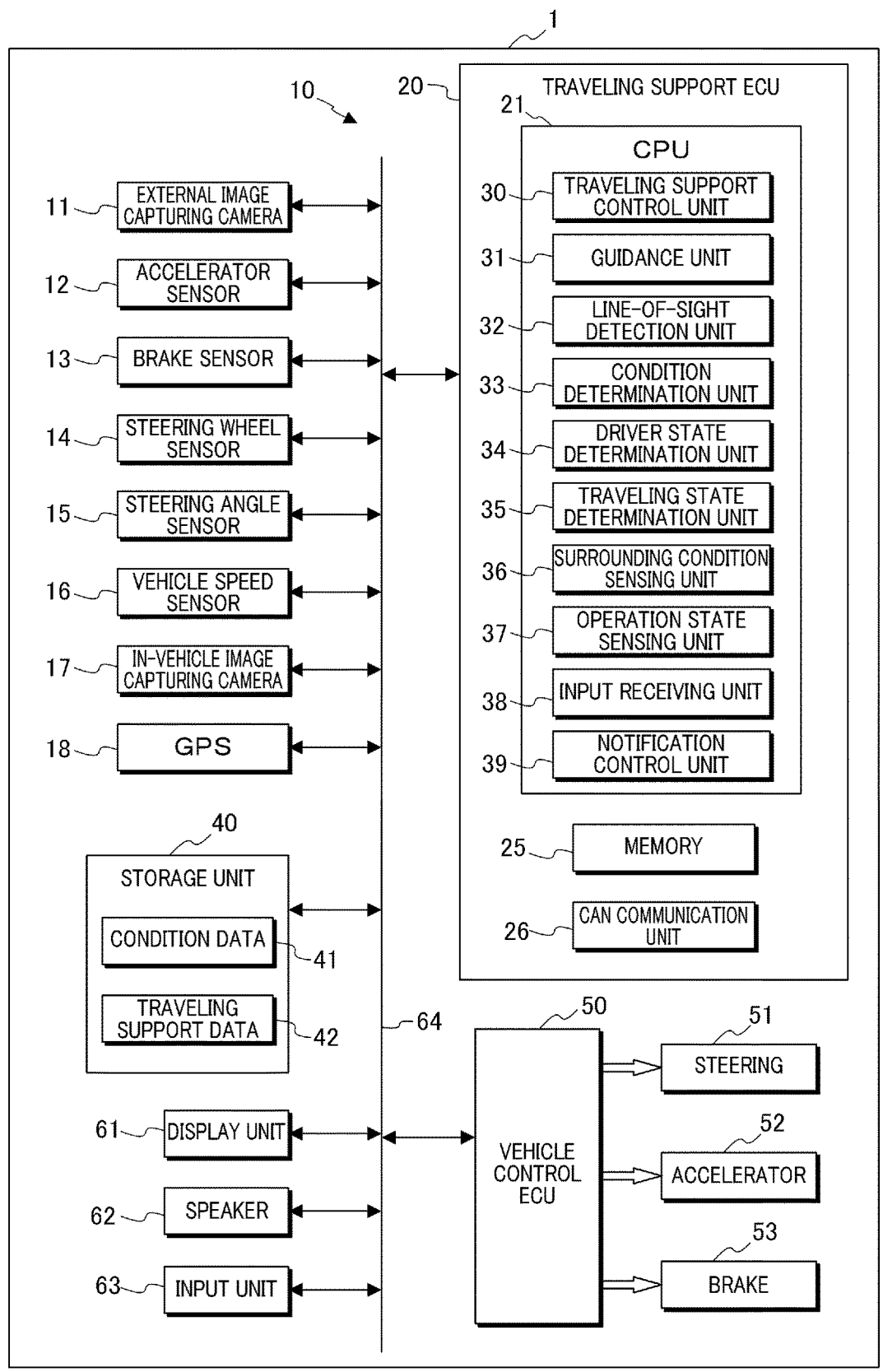
FIG. 1 is a block diagram showing a configuration of a vehicle control system.

FIG. 1 is a diagram showing a configuration of a control system of a vehicle 1 according to the embodiments.

The vehicle 1 is a vehicle having a power source mounted, is self-propelled, and is specifically a four-wheeled vehicle, a motorcycle, or the like. The power source may be an internal combustion engine or an electric motor, and may also have a configuration in which a plurality of types of power sources are mounted. In the following description, the vehicle 1 is shown as an example of a four-wheeled vehicle that travels by the power of the internal combustion engine. Further, in the following description, the movement direction of the vehicle 1 during normal traveling is the front.

The vehicle 1 includes a vehicle-mounted device 10 that controls the vehicle 1. The vehicle-mounted device 10 includes a traveling support ECU (Electronic Control Unit) 20, a storage unit 40, a vehicle control ECU 50, a display unit 61, a speaker 62, and an input unit 63. The vehicle-mounted device 10 functions as a state determination device and a driving support device that assist the driver in driving the vehicle 1.

The vehicle 1 includes a steering 51, an accelerator 52, and a brake 53 that operate the vehicle 1 in response to driver's driving operation. The steering 51 is a mechanism that steers the vehicle 1 in response to operation of a steering wheel, which is not shown (steering wheel operation). The accelerator 52 is a mechanism that controls the acceleration of the vehicle 1 according to operation of accelerator pedal, which is not shown (accelerator operation). The brake 53 is a mechanism that controls the deceleration of the vehicle 1 according to operation of a brake pedal, which is not shown (brake operation). The steering 51 includes an actuator (not shown) that is operated under the control of the vehicle control ECU 50. The vehicle control ECU 50 drives the actuator of the steering 51 to operate the steering 51 instead of the driver. That is, the vehicle control ECU 50 can execute at least automatic driving related to steering of the vehicle 1, and operates the steering 51 instead of the driver. In addition, the vehicle control ECU 50 includes an actuator (not shown) that drives the accelerator 52 and the brake 53, and operates the accelerator 52 and the brake 53 when executing automatic driving. The vehicle control ECU 50 functions as an automatic driving control unit that executes automatic driving of the vehicle 1.

The vehicle 1 includes an external image capturing camera 11, an accelerator sensor 12, a brake sensor 13, a steering wheel sensor 14, a steering angle sensor 15, a vehicle speed sensor 16, an in-vehicle image capturing camera 17, and a GPS (Global Positioning System) 18. These individual units are connected to the traveling support ECU 20 and the vehicle control ECU 50 via a bus 64. The bus 64 is a communication path that connects the individual units so that they can communicate with each other via a CAN (Controller Area Network). Further, a part of individual sensors mounted on the vehicle may be connected to the bus 64 via a LIN (Local Interconnect Network) bus.

The external image capturing camera 11 is a camera for capturing the image outside the vehicle 1, and the angle of view of the external image capturing camera 11, namely, the image capturing range includes at least a predetermined range in the movement direction of the vehicle 1. The external image capturing camera 11 is, for example, a digital camera using a solid-state image-capturing element such as CCD (Charge Coupled Device) or CMOS (Complementary Metal Oxide Semiconductor). The external image capturing camera 11 captures an image and outputs the captured image data to the traveling support ECU 20.

The external image capturing camera 11 can be configured to include, for example, an ultra-wide-angle lens having an angle of view of 180 degrees or more, and in this case, can capture a relatively wide range of images. Further, the external image capturing camera 11 may be configured with a plurality of cameras having different image capturing ranges. Further, captured images of a plurality of cameras that capture images around the vehicle 1 may be combined to generate one or a plurality of captured image data, for example. The captured image data that the external image capturing camera 11 generates is output to the traveling support ECU 20 and temporarily stored in the memory 25.

The external image capturing camera 11 may be a monocular camera, or a plurality of external image capturing cameras 11 may configure a stereo camera. If the external image capturing camera 11 is a stereo camera, the traveling support ECU 20 can obtain the distance from the vehicle 1 for a subject located within the image capturing range of the external image capturing camera 11 based on the captured image of the external image capturing camera 11. As a result, the traveling support ECU 20 can detect a vehicle outside (hereinafter, another vehicle) in front of the vehicle 1 or an obstacle based on the captured image by the external image capturing camera 11.

Further, the vehicle 1 may include an ultrasonic sonar for sensing an object in the vicinity of the vehicle 1 and a radar device for sensing the distance to an obstacle existing in front of the vehicle 1 or in another direction.

The accelerator sensor 12 detects the throttle opening degree of the accelerator 52 and outputs the detected value via the bus 64. Further, the accelerator sensor 12 may be configured to detect whether the driver puts his/her foot on an accelerator pedal (not shown).

The brake sensor 13 detects the operation state of the brake 53 and outputs the detected result via the bus 64. Further, the brake sensor 13 may be configured to detect the pedaling force of a brake pedal (not shown) and output the detected value.

The steering wheel sensor 14 detects whether the driver is in touch with the wheel (steering wheel) to operate the steering 51, and outputs the detected result via the bus 64. The steering angle sensor 15 detects a steering angle of the steering 51 of the vehicle 1 and outputs the detected value via the bus 64. Here, the steering wheel sensor 14 may be configured to function as the steering angle sensor 15. That is, the steering wheel sensor 14 may detect the operation angle of the steering wheel and output the detected angle to the traveling support ECU 20 as the steering angle.

The vehicle speed sensor 16 detects the speed of the vehicle 1 and outputs the detected value via the bus 64.

The in-vehicle image capturing camera 17 is a digital camera including a CCD or a CMOS, and captures an image of an image capturing range of the vehicle 1 including the inside of the vehicle. The in-vehicle image capturing camera 17 outputs the captured image data to the traveling support ECU 20. The image capturing range of the in-vehicle image capturing camera 17 includes at least the position of the driver's face. More specifically, the entire range of the driver's face or at least any one of the positions of the driver's eyes is included in the image capturing range of the in-vehicle image capturing camera 17. The traveling support ECU 20 can detect the face direction or the line-of-sight direction of the driver from the image captured by the in-vehicle image capturing camera 17.

The GPS 18 executes positioning and outputs the current position of the vehicle 1.

The traveling support ECU 20 is a computer device that includes a CPU (Central Processing Unit) 21 and a memory 25 that stores a program executed by the CPU 21 or data processed by the CPU 21. The traveling support ECU 20 also includes a CAN communication unit 26 that executes CAN communication under the control of the CPU 21.

The CPU 21 executes the program stored in the memory 25 to control the vehicle-mounted device 10. The traveling support ECU 20 realizes various functions for traveling support through cooperation of software and hardware. Specifically, the traveling support ECU 20 includes a traveling support control unit 30, a guidance unit 31, a line-of-sight detection unit 32, a condition determination unit 33, a driver state determination unit 34, a traveling state determination unit 35, a surrounding condition sensing unit 36, an operation state sensing unit 37, an input receiving unit 38, and a notification control unit 39.

The memory 25 includes at least one of a nonvolatile storage unit such as a ROM (Read Only Memory) or a flash ROM, and a volatile storage unit such as a RAM (Random Access Memory). The memory 25 may be configured with a plurality of storage devices.

The traveling support ECU 20 is not limited to the configuration in which the program is executed by the CPU 21, and may be configured with programmed hardware such as FPGA (Field Programmable Gate Array).

The storage unit 40 is a device that stores data in a nonvolatile manner, and stores condition data 41 and traveling support data 42. The storage unit 40 may store map data for route guidance, for example, in addition to the condition data 41 and the traveling support data 42.

The display unit 61 includes a display screen configured with a liquid crystal display panel or the like, and displays images or letters on the display screen under the control of the traveling support ECU 20.

The speaker 62 outputs a voice according to the control of the traveling support ECU 20.

The input unit 63 is an operation unit that receives an input operation of the driver, and includes, for example, a touch sensor (not shown) or a switch that is disposed to overlap the display screen of the display unit 61. The input unit 63 detects a driver's operation and outputs the detected result to the traveling support ECU 20. The input unit 63 may be configured to be able to detect a voice input.

The vehicle control ECU 50 acquires the detected results of the accelerator sensor 12, the brake sensor 13, the steering wheel sensor 14, the steering angle sensor 15, the vehicle speed sensor 16, and the like. Further, the vehicle control ECU 50 analyzes the external situation of the vehicle 1 based on the image captured by the external image capturing camera 11. For example, the vehicle control ECU 50 performs a process of detecting an obstacle located in front of the vehicle 1, a process of detecting the lane of the road on which the vehicle 1 is traveling, or the like from the image captured by the external image capturing camera 11. The vehicle control ECU 50 operates at least one of the steering 51, the accelerator 52, and the brake 53 based on the acquired detected result to control the traveling of the vehicle 1.

The vehicle-mounted device 10 can switch between an automatic driving mode and a manual driving mode for execution. The automatic driving mode is an operation mode in which the vehicle control ECU 50 drives the vehicle 1 to travel, and a driver's driving operation is unnecessary. In the automatic driving mode, the vehicle control ECU 50 controls the traveling of the vehicle 1 and allows the vehicle 1 to travel without the driver operating the steering wheel or the accelerator pedal. The automatic driving mode corresponds to automatic driving levels 3 to 5 in "Taxonomy and Definitions for Terms Related to Driving Automation Systems for On-Road Motor Vehicles J3016_201609" formulated by SAE (Society of Automotive Engineers), for example. In the manual driving mode, the driver operates the steering wheel, the accelerator pedal, and the brake pedal to cause the vehicle 1 to travel.

The manual driving mode is an operation mode that requires a driver's operation, and is not limited to a traveling state only by the driver's operation. In the manual driving mode, the traveling support ECU 20 or the vehicle control ECU 50 may support a part of the travel of the vehicle 1. For example, the traveling support ECU 20 may output a warning for an obstacle in front of the vehicle 1. Further, for example, the traveling support ECU 20 or the vehicle control ECU 50 may execute driving assistance of automatic driving levels 1 and 2 defined by SAE. Specifically, when it is necessary to avoid an obstacle in front of the vehicle 1, the vehicle control ECU 50 may operate the brake 53 to activate the emergency brake. In addition, the manual driving mode does not limit various notifications executed by the traveling support ECU 20 or driving assistance executed by the vehicle control ECU 50.

Here, the operation mode of the vehicle-mounted device 10 is described below with reference to FIG. 2.

Figure 2:
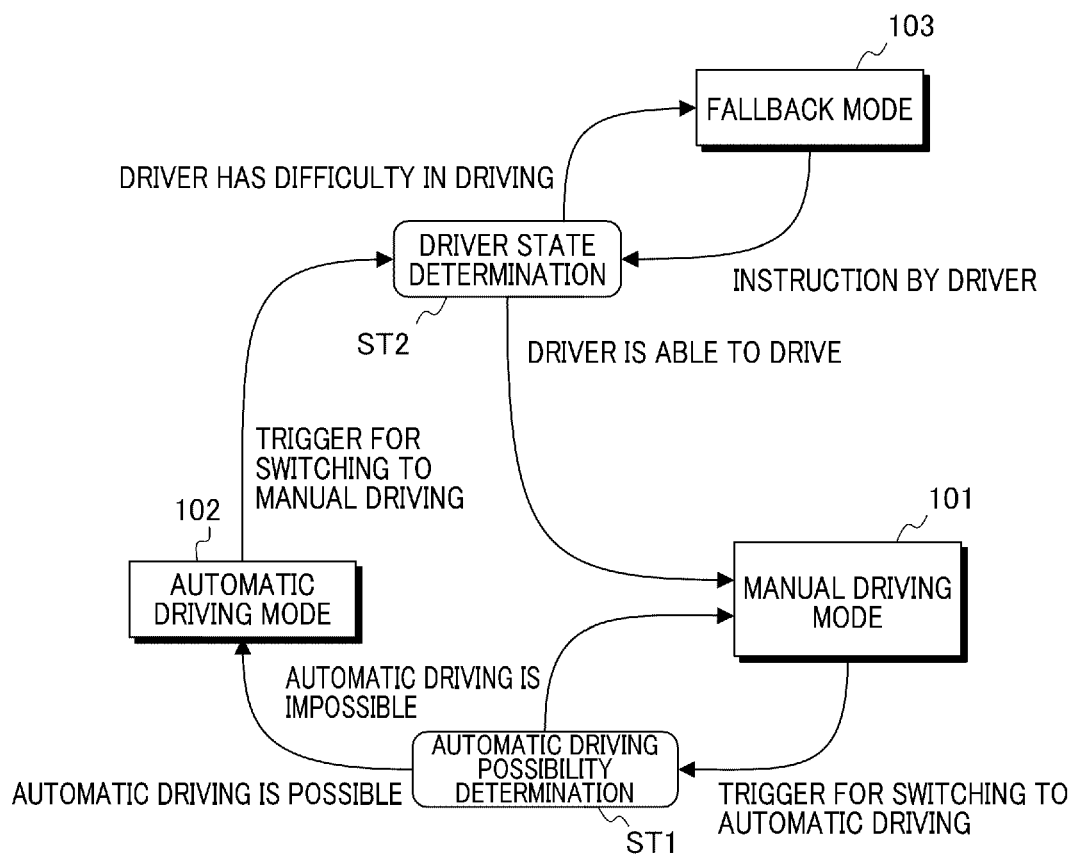
FIG. 2 is a state transition diagram showing an outline of the operation of the vehicle-mounted device.

FIG. 2 is a state transition diagram showing an outline of the operation of the vehicle-mounted device 10.

The operation state of the vehicle-mounted device 10 includes a fallback mode 103 as well as the manual driving mode 101 and the automatic driving mode 102 described above.

The vehicle-mounted device 10 executes a process of automatic driving possibility determination (step ST1) for shifting to the automatic driving mode 102 in transition from the manual driving mode 101 to the automatic driving mode 102. The process of automatic driving possibility determination in step ST1 starts, triggered by switching to the automatic driving, during execution of the manual driving mode 101. The trigger for switching to the automatic driving is, for example, an input operation on the input unit 63 by the driver.

The process of automatic driving possibility determination of step ST1 is a process of determining whether the vehicle control ECU 50 is in a state in which automatic driving can be executed. In step ST1, the traveling support ECU 20 determines that automatic driving is impossible, for example, when a lane or an obstacle cannot be appropriately detected from image data captured by the external image capturing camera 11 due to bad weather or direct sunlight. In addition, the traveling support ECU 20 determines that the automatic driving is possible when the vehicle control ECU 50 is in a state capable of executing the automatic driving.

When determining in step ST1 that automatic driving is impossible, the traveling support ECU 20 returns to the manual driving mode 101. When determining that automatic driving is possible, the traveling support ECU 20 shifts to the automatic driving mode 102 and starts automatic driving by the vehicle control ECU 50.

The vehicle-mounted device 10 executes a process of driver state determination (step ST2) in transition from the automatic driving mode 102 to the manual driving mode 101. The process of driver state determination in step ST2 starts, triggered by switching to the manual driving, during execution of the automatic driving mode 102. The trigger for switching to the manual driving is, for example, an input operation on the input unit 63 by the driver.

The process of driver state determination in step ST2 is a process of determining whether the driver of the vehicle 1 is in a state of being able to executing a manual driving operation. In step ST2, the traveling support ECU 20 informs the driver that manual driving is starting. Further, the traveling support ECU 20 detects the line-of-sight of the driver, and makes a determination based on whether the driver's line-of-sight direction satisfies a preset condition. Although the determination is described below in detail, the traveling support ECU 20 determines that the driver is not in a state of being able to execute the manual driving, for example, when the driver's line-of-sight does not face a preset direction, or when the driver's line-of-sight stays in the preset direction for a short time.

When determining that a manual driving operation is possible in the process of driver state determination, the traveling support ECU 20 shifts to the manual driving mode 101.

In addition, when determining that the operation of the manual driving is difficult in the process of state determination, the traveling support ECU 20 shifts to the fallback mode 103.

The fallback mode 103 is a driving mode for decelerating the vehicle 1 and finally stopping the vehicle 1, and the vehicle control ECU 50 controls the traveling of the vehicle 1. The vehicle control ECU 50 decelerates the vehicle 1 in the fallback mode 103. The vehicle control ECU 50 detects a place where the vehicle 1 can stop, causes the vehicle 1 to travel toward the sensed place, and stops the vehicle 1. The vehicle control ECU 50 detects a place where the vehicle 1 can stop, for example, based on a captured image of the external image capturing camera 11, a position of the vehicle 1 that the GPS 18 senses, or map data (not shown).

The fallback mode 103 is an operation mode suitable for ensuring the safety of the vehicle 1 when the vehicle control ECU 50 does not continue the automatic driving and the driver is in a state in which the driver has difficulty in the driving operation of the vehicle 1.

In addition, when the driver operates the input unit 63 and gives an instruction to start the manual driving in the fallback mode 103, the traveling support ECU 20 executes the process of driver state determination of step ST2 again.

Thus, the vehicle-mounted device 10 can execute the manual driving mode 101 in which the driver drives and the automatic driving mode 102 in which the vehicle control ECU 50 drives, and can transfer the driving operation from the vehicle control ECU 50 to the driver during execution of the automatic driving mode 102. That is, it is possible to switch from the automatic driving mode 102 to the manual driving mode 101. This switching can be executed by any trigger. Then, when shifting from the automatic driving mode 102 to the manual driving mode 101, the vehicle-mounted device 10 determines whether the driver is in a state of being able to execute a manual driving.

In the driver state determination process (step ST2), the traveling support ECU 20 uses the condition data 41 that the storage unit 40 stores to determine the driver's state.

Figure 3:
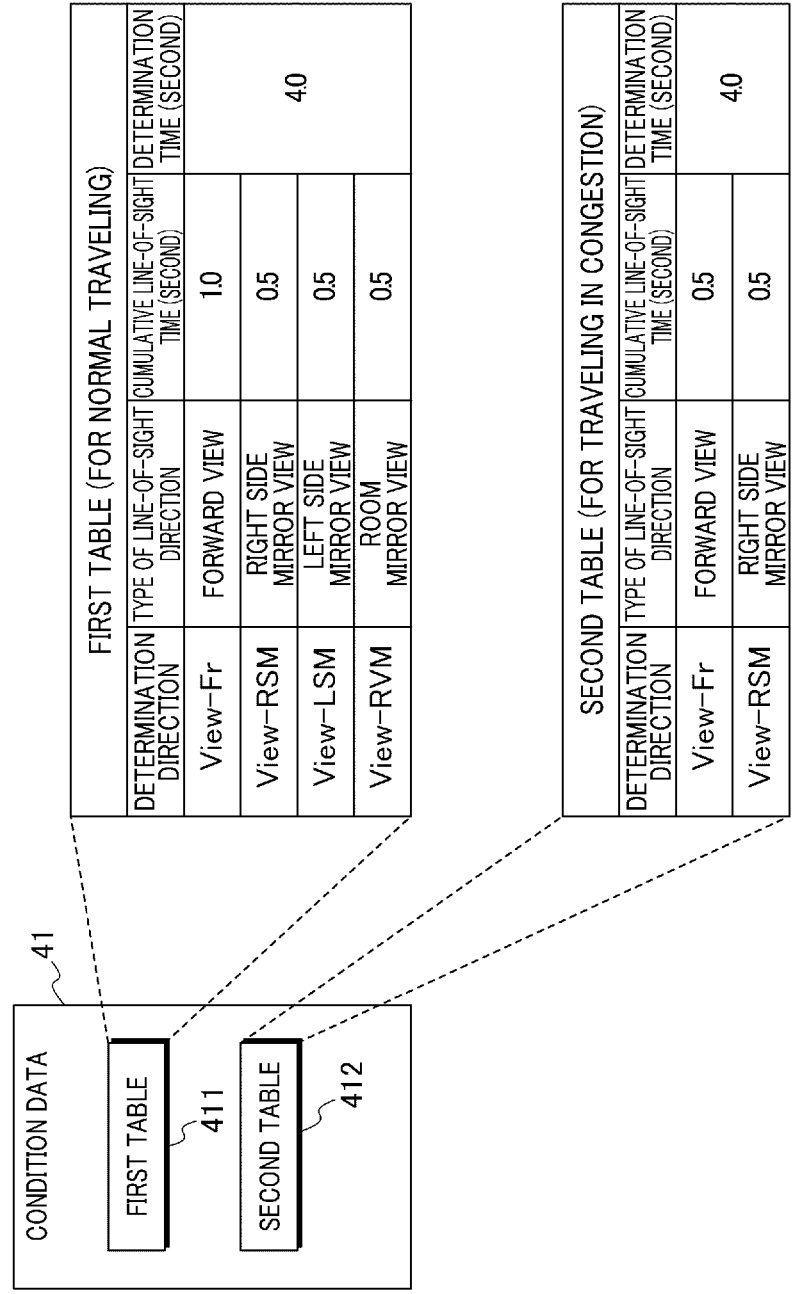
FIG. 3 is a schematic diagram showing a configuration of condition data that a vehicle-mounted device stores.

FIG. 3 is a schematic diagram showing the configuration of the condition data 41 that the vehicle-mounted device 10 stores therein.

The condition data 41 is data that defines criteria for determining the driver's state in the process of driver state determination. The condition data 41 can be in various formats such as a numerical value or a range of numerical values, an arithmetic expression, a table, or the like, including determination criteria. FIG. 3 shows a first table 411 and a second table 412 in a table format as an example of the configuration of the condition data 41.

The first table 411 is a table for normal traveling, and the second table 412 is a table for traveling in congestion. In the example shown in FIG. 3, the condition data 41 includes a plurality of tables corresponding to the traveling state of the vehicle 1. The plurality of tables that the condition data 41 includes can be selectively used according to the traveling state of the vehicle 1.

In this embodiment, the vehicle-mounted device 10 determines the state of the driver based on whether the driver's line-of-sight faces a specific direction and the time during which the driver's line-of-sight faces the specific direction. The first table 411 includes data that defines directions which the driver's line-of-sight should face. In addition, the first table 411 includes data that defines the time when the driver's line-of-sight should face each of the set directions.

Specifically, the first table 411 defines four directions of View-Fr, View-RSM, View-LSM, and View-RVM as "determination directions" indicating directions which the driver's line-of-sight should face. View-Fr is the direction to look at the windshield from the driver's seat. View-RSM is the direction to look at the right side mirror from the driver's seat, View-LSM is the direction to look at the left side mirror from the driver's seat, and View-RVM is the direction to look at the room mirror from the driver's seat. In the first table 411, as the types of the line-of-sight directions, View-Fr is defined to be "forward view", View-RSM "right side mirror view", View-LSM "left side mirror view", and View-RVM "room mirror view".

View-Fr, View-RSM, View-LSM, View-RVM may be data indicating a specific one direction, or may be a range of directions which the driver's line-of-sight should face. That is, the driver's line-of-sight is determined to face the View-Fr when the driver's line-of-sight direction overlaps a specific range of the windshield. Each of the View-RSM, the View-LSM, and the View-RVM may also be in a range of the driver's line-of-sight.

The first table 411 includes "cumulative line-of-sight time" indicating the time during which the driver's line-of-sight should face each direction defined by the "determination direction". Each cumulative line-of-sight time is set for each determination direction. In the first table 411, the cumulative line-of-sight time of View-Fr is set to 1.0 second, and the cumulative line-of-sight time of View-RSM, View-LSM, and View-RVM each are set to 0.5 seconds. That is, when the cumulative time during which the driver's line-of-sight faces View-Fr reaches 1.0 second, the traveling support ECU 20 determines that the cumulative time has satisfied the condition for View-Fr. View-RSM, View-LSM, and View-RVM are the same except that their criteria are 0.5 seconds.

Further, the first table 411 includes a "determination time" that indicates a period for detecting the time during which the driver's line-of-sight should face the direction defined in each "determination direction". In the example of FIG. 3, the "determination time" of the first table 411 is 4.0 seconds. That is, the traveling support ECU 20 detects the cumulative line-of-sight time in each determination direction for only 4.0 seconds. In other words, it is required that the cumulative line-of-sight time that is detected in each determination direction reaches the set value of the first table 411 within 4.0 seconds. The determination time is a time from when the traveling support ECU 20 gives a guidance to the driver to execute the driver state determination process as described later.

In this way, the first table 411 defines conditions in which the driver's line of sight faces the directions set in the "determination direction" within the "determination time" and the time during which the driver's line of sight faces each "determination direction" reaches each time set as "cumulative line-of-sight time". The determination time can be referred to as a first reference time, and the cumulative line-of-sight time can be referred to as a second reference time. The determination direction is the direction which the driver's line-of-sight should face, and can be referred to as a gaze direction. Then, the first table 411 can be regarded as a gaze condition for making a determination with respect to the line-of-sight of the driver.

In the second table 412, View-Fr and View-RSM are defined as the "determination direction", and each cumulative line-of-sight time is set to 0.5 seconds. The "determination time" is 4.0 seconds.

The traveling support ECU 20 can exclusively select the first table 411 and the second table 412. The first table 411 is a table for normal traveling, and the second table 412 is a table for traveling in congestion. For example, the traveling support ECU 20 determines whether the traveling state of the vehicle 1 is traveling in congestion, and selects the first table 411 in the case of not traveling in congestion and selects the second table 412 in the case of traveling in congestion. The operation of the traveling support ECU 20 selecting the first table 411 and the second table 412 is described in the second embodiment.

The condition data 41 may include other tables corresponding to the traveling state of the vehicle 1 in addition to the first table 411 and the second table 412. For example, the condition data 41 may include a table for high-speed traveling used when the vehicle 1 travels on a highway or a motorway.

Returning to FIG. 1, the traveling support data 42 is data for the vehicle control ECU 50 to perform driving support and automatic driving, and includes, for example, data regarding specifications or characteristics of the steering 51, the accelerator 52, and the brake 53 of the vehicle 1. Further, the traveling support data 42 may include map data.

The storage unit 40 may also include a program that the CPU 21 executes or other data that the CPU 21 processes.

The traveling support control unit 30 of the CPU 21 executes operation modes of the manual driving mode 101, the automatic driving mode 102, and the fallback mode 103. Further, the traveling support control unit 30 controls the mode transitions of the manual driving mode 101, the automatic driving mode 102, and the fallback mode 103. For example, when transitioning from the manual driving mode 101 to the automatic driving mode 102, the traveling support control unit 30 executes the process of automatic driving possibility determination (step ST1), and causes the vehicle control ECU 50 to execute the automatic driving based on the processing result. In addition, when transitioning from the automatic driving mode 102 to the manual driving mode 101, the traveling support ECU 20 executes the process of driver state determination (step ST2) and controls the transition to the manual driving mode 101 or the fallback mode 103 according to the execution result. The traveling support control unit 30 functions as a driving mode control unit that switches operation modes.

The guidance unit 31 uses the display unit 61 and/or the speaker 62 to output guidance when the traveling support control unit 30 starts the process of driver state determination. This operation can be referred to as information or notification. The guidance unit 31 displays letters or an image indicating that the process of driver state determination is starting on the display unit 61, or informs that the process of driver state determination is starting in voice by the speaker 62. The guidance unit 31 may inform, based on the condition data 41, the "determination direction" that is the direction to which the driver should direct his/her line-of-sight, and the "cumulative line-of-sight time" that is the time during which the driver should direct his/her line-of-sight, and may inform the "determination time".

The line-of-sight detection unit 32 detects the direction of the driver's line-of-sight. The line-of-sight detection unit 32 may directly sense the eyes or line-of-sight of the driver, or may indirectly sense the line-of-sight from the direction of the driver's face. For example, the line-of-sight detection unit 32 detects the image of the eyes of the driver from the image data captured by the in-vehicle image capturing camera 17, and identifies the direction which the driver's eyes face as the line-of-sight direction. Alternatively, for example, the line-of-sight detection unit 32 detects the image of the driver's face from the image data captured by the in-vehicle image capturing camera 17 to identify the direction which the driver's face faces. In this case, the line-of-sight detection unit 32 detects the direction of the driver's face as the line-of-sight direction.

The condition determination unit 33 determines whether the direction of the driver's line-of-sight detected by the line-of-sight detection unit 32 satisfies the condition of the condition data 41 when the traveling support ECU 20 executes the process of driver state determination.

The driver state determination unit 34 determines, based on the determination result of the condition determination unit 33, whether the driver is in a state of being able to perform the manual driving operation or a state of having difficulty in performing the manual driving operation.

The traveling state determination unit 35 determines the traveling state of the vehicle 1. For example, the traveling state determination unit 35 determines whether the vehicle 1 is traveling in congestion, is in normal traveling, or is traveling at high speed. The traveling state determination unit 35 may perform a process of detecting another vehicle, which is a vehicle around the vehicle 1, a road facility, a pedestrian, or the like from the captured image data of the external image capturing camera 11. The traveling state determination unit 35 may also acquire the vehicle speed output by the vehicle speed sensor 16 to use the vehicle speed for the determination. Further, the traveling state determination unit 35 may acquire the detected value of the steering angle detected by the steering angle sensor 15 to use the detected value for the determination.

The surrounding condition sensing unit 36 senses a surrounding situation of the vehicle 1. For example, the surrounding condition sensing unit 36 senses an obstacle in front of the vehicle 1. Further, the surrounding condition sensing unit 36 detects the number of other vehicles located in front of the vehicle 1, road facilities in front of the vehicle 1, the number of lanes on the road on which the vehicle 1 is traveling, and the like. When sensing them, the surrounding condition sensing unit 36 acquires and analyzes captured image data of the external image capturing camera 11, for example.

The operation state sensing unit 37 determines the state in which the driver operates the vehicle 1. The operation state sensing unit 37 acquires the sensed results of the accelerator sensor 12, the brake sensor 13, and the steering wheel sensor 14, to sense the state in which the driver operates the accelerator pedal, the brake pedal, and the steering wheel.

The input receiving unit 38 receives an input that the driver makes to the input unit 63. The input receiving unit 38 is a functional unit for the traveling support ECU 20 to detect an input, and can also be referred to as an input unit.

The notification control unit 39 uses the display unit 61 and/or the speaker 62 to notify the driver.

Figure 4:
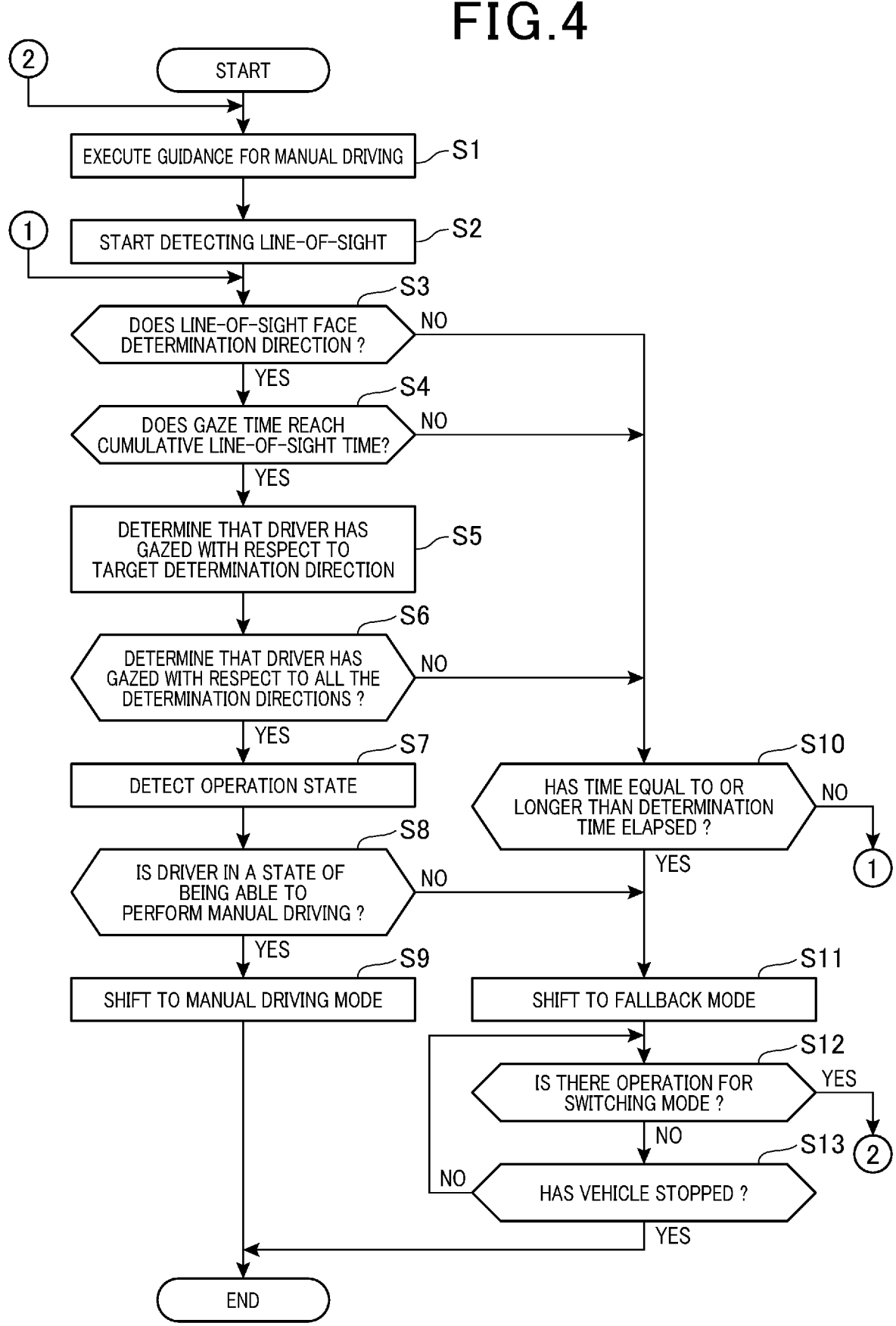
FIG. 4 is a flowchart showing operation of a vehicle-mounted device according to a first embodiment.

FIG. 4 is a flowchart showing the operation of the vehicle-mounted device 10.

The operation shown in FIG. 4 is executed with a start which is a trigger for switching to the manual driving, generated during execution of the automatic driving mode 102. That is, FIG. 4 shows the operation of the vehicle-mounted device 10 in the process of driver state determination (step ST2).

The traveling support ECU 20 executes guidance for starting the process of driver state determination by the guidance unit 31 (step S1), and starts detecting of the line-of-sight by the line-of-sight detection unit 32 (step S2). In step S1, the traveling support control unit 30 functions as a guidance sensing unit that senses that guidance has been provided by the guidance unit 31. The guidance unit 31, for executing the guidance, itself may function as a guidance sensing unit sensing that the guidance has been executed.

In the operation illustrated in FIG. 4, the traveling support ECU 20 uses the first table 411 set as the default (initial value) out of the tables that the condition data 41 includes.

The condition determination unit 33 determines whether the direction of the line-of-sight sensed by the line-of-sight detection unit 32 faces the determination direction set in the first table 411 (step S3). When determining that the direction of the line-of-sight faces the determination direction (step S3; YES), the condition determination unit 33 determines whether the time during which the line-of-sight direction meets in the determination direction, namely the gaze time, has reached the cumulative line-of-sight time of the first table 411 (step S4).

When the gaze time reaches the cumulative line-of-sight time (step S4; YES), the condition determination unit 33 determines that the driver gazes in the determination direction determined in step S3 (step S5). The condition determination unit 33 determines whether it has been determined that the driver has gazed in all the determination directions set in the first table 411 (step S6).

Here, when the condition determination unit 33 determines that the driver has gazed in all the determination directions set in the first table 411 (step S6; YES), the traveling support control unit 30 controls to cause the operation state sensing unit 37 to detect the operation state (step S7).

In step S7, the operation state sensing unit 37 senses the state of the driver's driving operation based on the detected values of the accelerator sensor 12, the brake sensor 13, and the steering wheel sensor 14.

The traveling support control unit 30 determines whether the driver is in a state of being able to execute manual driving, based on the operation state detected by the operation state sensing unit 37 (step S8). For example, the traveling support control unit 30 determines that the driver is able to execute the manual driving when the driver is in touch with the steering wheel or depresses either the accelerator pedal or the brake pedal. When determining that the manual driving can be executed (step S8; YES), the traveling support control unit 30 shifts to the manual driving mode 101 (step S9).

In this way, when the traveling support control unit 30 determines that the driver has gazed in all the determination directions set in the first table 411 until the determination time, which is the first reference time, elapses from the guidance to the driver, the traveling support control unit 30 shifts to the manual driving mode 101. Also, when the operation state of at least one of the steering wheel, the accelerator pedal and the brake pedal is in a state where manual driving is possible, in shifting to the manual driving mode 101, the traveling support control unit 30 shifts to the manual driving mode 101. As a result, since the traveling support control unit 30 shifts to the manual driving mode 101 after confirming the driver is in a state of being able to perform manual driving, the shift from the automatic driving mode 102 to the manual driving mode 101 can be performed more safely and smoothly.

On the other hand, when the condition determination unit 33 determines that the driver's line-of-sight does not face the determination direction (step S3; NO), and determines that the gaze time has not reached the cumulative line-of-sight time (step S4; NO), the condition determination unit 33 shift to step S10. Further, the condition determination unit 33 shifts to step S10 when there is a determination direction which is not determined to be gazed out of the determination directions set in the first table 411 (step S6; NO).

In step S10, the condition determination unit 33 determines whether the elapsed time from when the guidance is executed in step S1 is equal to or longer than the determination time set in the first table 411 (step S10). Here, when the elapsed time from when the guidance is executed has not reached the determination time set in the first table 411 (step S10; NO), the condition determination unit 33 returns to step S3.

Further, when the elapsed time from when the guidance is executed has reached the determination time set in the first table 411 (step S10; YES), the traveling support control unit 30 shifts the operation mode of the vehicle-mounted device 10 to the fallback mode 103 in FIG. 2 (step S11). That is, when the traveling support ECU 20 does not determine that the driver has gazed at all the determination directions of the first table 411 until the determination time, which is the first reference time, elapses from the guidance to the driver, the vehicle-mounted device 10 shifts to fallback mode 103.

In addition, when traveling support control unit 30 determines that the driver is not in a state of being able to execute the manual driving (step S8; NO), the traveling support control unit 30 also shifts the operation mode to the fallback mode 103 (step S11).

The traveling support control unit 30 reduces the speed of the vehicle 1 by the vehicle control ECU 50 in the fallback mode 103, executes driving control until the vehicle stops, and determines whether there is an operation for instructing the input unit 63 to switch the operation mode (step S12). Here, when the input receiving unit 38 detects an operation of instruction for switching the operation mode (step S12; YES), the traveling support control unit 30 returns to step S1.

When there is no operation of instruction for switching the operation mode (step S12; NO), the traveling support control unit 30 determines whether the vehicle 1 has stopped (step S13). When the vehicle 1 has not stopped (step S13; NO), the traveling support control unit 30 returns to step S12. Then, when the vehicle 1 has stopped (step S13; YES), the traveling support control unit 30 ends this processing.

As described above, the vehicle-mounted device 10 of this embodiment is a device that determines the state of the driver of the vehicle 1, and includes a traveling support control unit 30, a line-of-sight detection unit 32, a condition determination unit 33, and a driver state determination unit 34. The traveling support control unit 30 senses that the driver is provided with guidance regarding the driving operation. The line-of-sight detection unit 32 detects the direction of the driver's line-of-sight. The condition determination unit 33 determines whether the gaze conditions are satisfied where the gaze conditions include: that the driver's line-of-sight faces the determination directions with respect to the preset determination directions (gaze direction) within the determination time (first reference time) from when the traveling support control unit 30 senses the guidance; and that the time during which the driver's line-of-sight faces the determination direction is equal to or longer than each of the cumulative line-of-sight times (second reference times). The driver state determination unit 34 determines whether the driver is in a state of being able to drive based on the determination result of the condition determination unit 33.

Here, the operation in which the traveling support control unit 30 senses the guidance corresponds to a guidance sensing step, the operation of the line-of-sight detection unit 32 corresponds to a line-of-sight detection step, and the operation of the condition determination unit 33 corresponds to a condition determination step. Further, the operation of the driver state determination unit 34 corresponds to a driver state determination step.

According to the vehicle-mounted device 10 to which the state determination device and the state determination method of the present invention are applied, it is possible to determine whether the driver's state is suitable for driving, based on the driver's line-of-sight.

It is sufficient that the driver performs an operation of directing his/her line-of-sight in a designated direction after the guidance by the vehicle-mounted device 10 to appeal that he/she is in a state of being capable of driving operation, and the vehicle-mounted device 10 can more reliably determine that the driver is in a state of being able to drive. In addition, since the vehicle-mounted device 10 makes the determination on the condition that the driver's line-of-sight has faced the set direction for the set time or longer, the vehicle-mounted device 10 can appropriately determine not only that the driver is awake but also that the driver is in a state suitable for driving.

In addition, the vehicle-mounted device 10 as the driving support device includes: a vehicle control ECU 50 that controls traveling of the vehicle 1, and a traveling support control unit 30 that switches between an automatic driving mode in which the vehicle control ECU 50 performs traveling control and a manual driving mode in which a driver's operation causes the vehicle 1 to travel. The vehicle-mounted device 10 includes the line-of-sight detection unit 32, the condition determination unit 33, and the driver state determination unit 34. The traveling support control unit 30 senses that the driver is provided with guidance regarding the driving operation. The line-of-sight detection unit 32 detects the direction of the driver's line-of-sight. The condition determination unit 33 determines whether the gaze conditions are satisfied where the gaze conditions include: that the driver's line-of-sight faces the determination directions with respect to the preset determination directions (gaze direction) within the determination time (first reference time) from when the traveling support control unit 30 senses the guidance; and that the time during which the driver's line-of-sight faces the determination direction is equal to or longer than each of the cumulative line-of-sight times (second reference times). The driver state determination unit 34 determines whether the driver is in a state of being able to drive based on the determination result of the condition determination unit 33. In the automatic driving mode, the traveling support control unit 30 switches to the manual driving mode when the driver state determination unit 34 determines that the driver is in a state of being able to drive.

According to the vehicle-mounted device 10 to which the driving support device and the driving support method of the present invention are applied, it is possible to determine whether the driver's state is suitable for driving, based on the driver's line-of-sight. As a result, it is possible to switch from the automatic driving to the manual driving after confirming that the driver is in a state of being able to perform the manual driving operation. In addition, since the vehicle-mounted device 10 determines the driver's state on condition that the driver's line-of-sight has faced the set direction for the set time or longer, the vehicle-mounted device 10 can determine more reliably that driver's state is a state capable of driving.

In the vehicle-mounted device 10, when the driver state determination unit 34 determines that the gaze condition is satisfied for all the set determination directions, based on the condition data 41 in which a plurality of determination directions are set as the determination targets, the driver state determination unit 34 determines that the driver is in a state of being able to drive. Therefore, it is possible to appropriately determine that the driver is in a state of being able to drive based on more complicated conditions with respect to the driver's line-of-sight.

Further, the line-of-sight detection unit 32 identifies the line-of-sight direction by detecting the direction of the line-of-sight or the face of the driver, so that the line-of-sight detection unit 32 can reliably detect the direction of the line-of-sight of the driver by a simple means such as the external image capturing camera 11.

Further, the traveling support control unit 30 uses the guidance unit 31 to provide the driver with guidance to start driving by voice or display, and can reliably provide the guidance to start the process of driver state determination for manual driving.

Further, when the vehicle-mounted device 10 determines that the driver's state is not suitable for driving while shifting from the automatic driving mode 102 to the manual driving mode 101, the vehicle-mounted device 10 shifts to fallback mode 103. As a result, the vehicle-mounted device 10 can end the automatic driving mode 102 while keeping the traveling safety.

Second Embodiment

Figure 5:
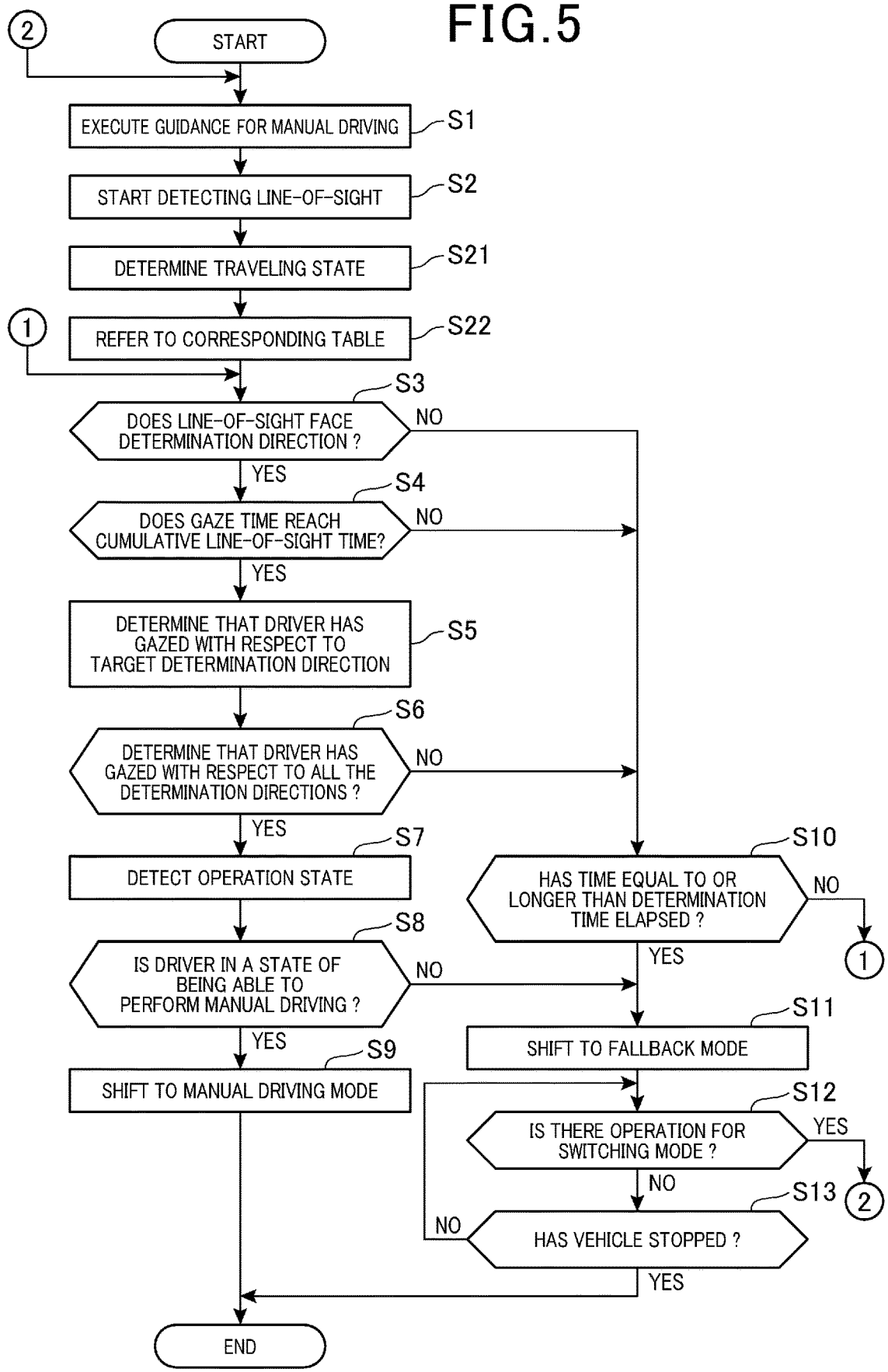
FIG. 5 is a flowchart showing operation of a vehicle-mounted device according to a second embodiment.

FIG. 5 is a flowchart showing operation of a vehicle-mounted device 10 according to a second embodiment.

The operation of FIG. 5 is an operation of the vehicle-mounted device 10 in a process of driver state determination (step ST2), and the operation is executed, instead of the operation shown in FIG. 4, with a start which is a trigger for switching to a manual driving, generated during execution of an automatic driving mode 102. In the operation of FIG. 5, steps common to those of FIG. 4 are designated by the same step numbers, and description thereof is omitted.

In the second embodiment, the traveling support ECU 20 uses the determination result that the traveling state determination unit 35 has made with respect to the traveling state of a vehicle 1. When the traveling support ECU 20 uses the line-of-sight detection unit 32 to start detecting the line-of-sight (step S2), the traveling support ECU 20 uses the traveling state determination unit 35 to determine the traveling state of the vehicle 1 (step S21).

The condition determination unit 33 refers to the condition data 41 stored in the storage unit 40 corresponding to the traveling state determined by the traveling state determination unit 35 in step S21 (step S22). For example, when the traveling state determination unit 35 determines that the traveling state of the vehicle 1 is "in congestion", the condition determination unit 33 refers to the second table 412 in step S22. Further, for example, when the traveling state determination unit 35 determines that the traveling state of the vehicle 1 is "in normal traveling", the condition determination unit 33 refers to the first table 411 in step S22.

After that, the condition determination unit 33 executes the process of step S3 and subsequent steps based on the condition set in the table of the condition data 41 referred to in step S22.

Thus, the vehicle-mounted device 10 according to the second embodiment includes: the storage unit 40 that stores condition data 41 that determines the determination direction and the cumulative line-of-sight time in association with the traveling state of the vehicle 1; and the traveling state determination unit 35 that determines the traveling state of the vehicle 1. The condition determination unit 33 and the driver state determination unit 34 of the vehicle-mounted device 10 make determination, based on the condition data 41 stored in the storage unit 40 in association with the traveling state determined by the traveling state determination unit 35.

According to this configuration, the determination direction determined by the driver state determination unit 34 is set by the first table 411 and the second table 412 stored corresponding to the traveling state of the vehicle 1. The condition determination unit 33 determines the line-of-sight of the driver based on the determination direction corresponding to the traveling state of the vehicle 1.

The second table 412 is a table that is set corresponding to congestion, and has a smaller number of determination directions than the first table 411. This corresponds to the difference in the attention required of the driver in normal traveling and the attention required in congestion. Therefore, the vehicle-mounted device 10 can quickly determine the driver's state based on the second table 412 having few conditions regarding the line-of-sight in congestion, and can properly determine the driver's state using more determination directions in normal traveling.

Further, different cumulative line-of-sight time can be set in the first table 411 and the second table 412. In this case, the cumulative line-of-sight time is set corresponding to the determination direction and the traveling state of the vehicle 1. As a result, the condition used for determining the driver's state can be set in detail corresponding to the traveling state of the vehicle 1, and the state of the driver can be determined more appropriately when the automatic driving mode 102 is shifted to the manual driving mode 101.

Third Embodiment

Figure 6:
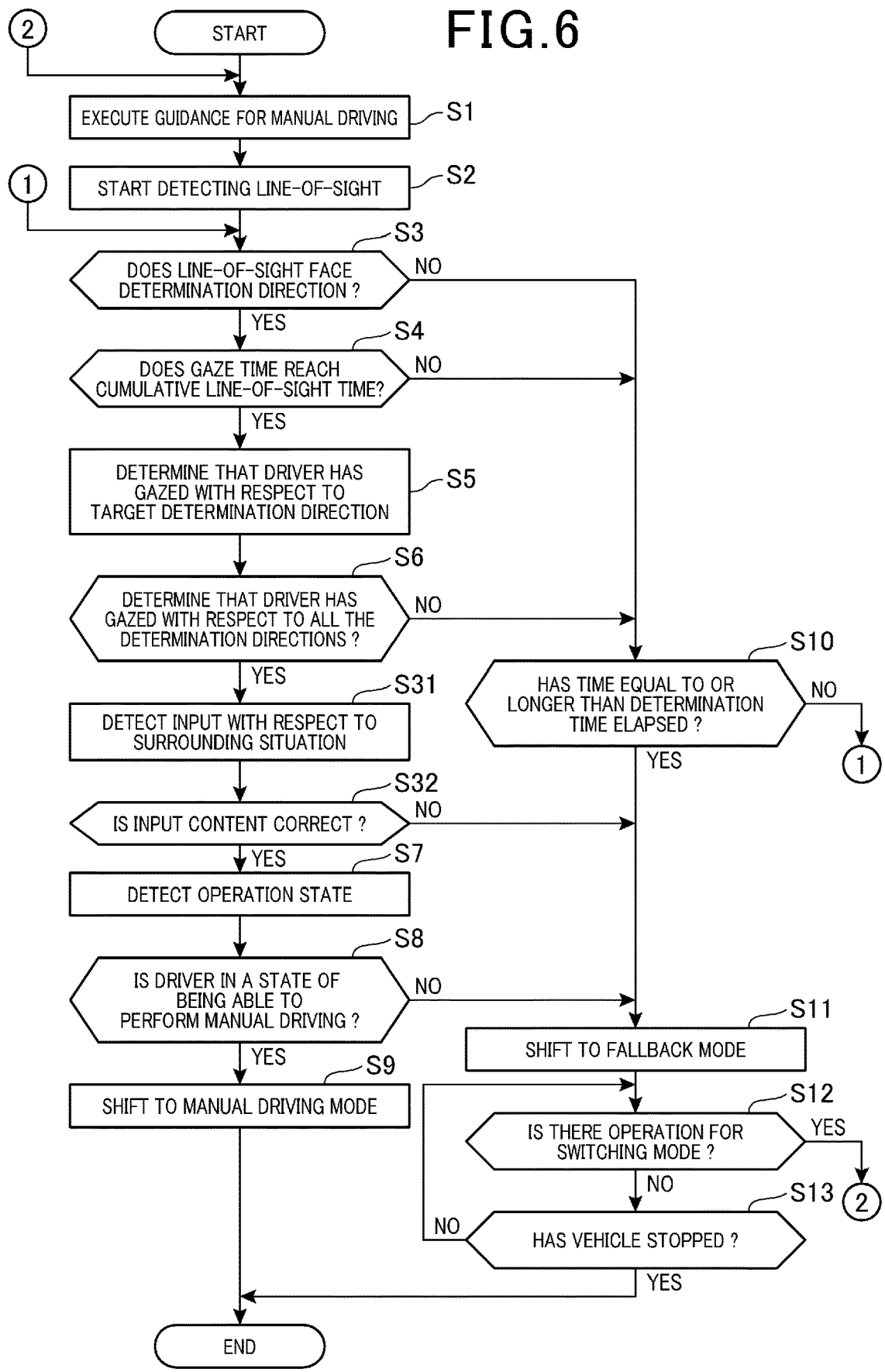
FIG. 6 is a flowchart showing operation of a vehicle-mounted device according to a third embodiment.

FIG. 6 is a flowchart showing the operation of the vehicle-mounted device 10 according to a third embodiment.

The operation of FIG. 6 is an operation of the vehicle-mounted device 10 in a driver state determination process (step ST2), and the operation is executed, instead of the operation shown in FIG. 4, with a start which is a trigger for switching to a manual driving, generated during execution of an automatic driving mode 102. In the operation of FIG. 6, steps common to those of FIG. 4 are designated by the same step numbers, and description thereof is omitted.

In the third embodiment, the traveling support ECU 20 uses the determination result that the surrounding condition sensing unit 36 has made with respect to the surrounding situation of the vehicle 1.

When determining that the driver has gazed in all determination directions (step S6; YES), the traveling support ECU 20 receives the input of information on the surrounding situation by the driver (step S31). Here, the traveling support ECU 20 may output a message or the like that prompts the driver to make an input regarding the surrounding obstacle of the vehicle 1 or the vehicle 1, using the guidance unit 31.

After the input receiving unit 38 receives the input by the driver, the driver state determination unit 34 determines whether the content of the input is correct (step S32). In step S32, the driver state determination unit 34 determines whether the input content matches the determination result made by the surrounding condition sensing unit 36. For example, in step S31, the guidance unit 31 guides the driver to input the number of other vehicles in front of the vehicle 1, and the surrounding condition sensing unit 36 detects the number of other vehicles in front of the vehicle 1 based on the captured image data of the external image capturing camera 11. In step S32, the driver state determination unit 34 compares the number of other vehicles input by the driver with the number of other vehicles detected by the surrounding condition sensing unit 36, and determines that the input is correct when the numbers are identical.

When determining that the input content of the driver is correct, the driver state determination unit 34 executes the operations of step S7 and subsequent steps.

When determining that the driver's input content is not correct, the driver state determination unit 34 determines that the driver is not in a state of being able to drive, and shifts to step S11.

As described above, the vehicle-mounted device 10 according to the third embodiment includes the surrounding condition sensing unit 36 that senses the situation around the vehicle 1, and the input receiving unit 38 that receives the input of the driver. The driver state determination unit 34 determines that the driver is in a state of being able to drive when the gaze condition is determined to be satisfied with respect to the determination directions, and the input received by the input receiving unit 38 corresponds to the sensed result of the surrounding condition sensing unit 36. Thereby, combining the determination based on the direction of the driver's line-of-sight and the condition data 41, and the determination based on the driver's perception makes it possible to more appropriately determine whether the driver is in a state of being able to drive, and to shift from the automatic driving mode 102 to the manual driving mode 101.

The above-described embodiment is merely an example of an implementation aspect of the present invention, and can be modified and applied in any way without departing from the spirit of the present invention.

For example, the method in which the vehicle-mounted device 10 detects the line-of-sight of the driver is not limited to the method of using the captured image data of the in-vehicle image capturing camera 17, but a method of using an electromyograph or another method may be adopted. Further, in the above embodiment, the example is described where the present invention is applied to the vehicle-mounted device 10 that performs the automatic driving by the vehicle control ECU 50, but the application range of the present invention is not limited to this. For example, a device to which the present invention is applied may be separately configured with an automatic driving system that executes a manual driving mode 101 and an automatic driving mode 102, and includes a guidance unit 31 for guiding the driver while shifting from the automatic driving mode 102 to the manual driving mode 101. In this case, the present invention may be, for example, a smartphone or a portable vehicle-mounted device, or the vehicle-mounted device fixed to the vehicle 1 may be configured as a system different from the automatic driving system. In this case, the device to which the present invention is applied may sense that the guidance by the guidance unit 31 has been performed, based on the communication between the devices, or based on voice collected by a microphone or a captured image captured by a camera.

Further, for example, the functional block shown in FIG. 1 is a schematic diagram in which the functions of the device mounted on the vehicle 1 are classified and shown according to the main processing content. For example, the configuration of the traveling support ECU 20 can be divided into more blocks according to the processing content. This functional block may also be configured to execute more processing by one block shown in FIG. 1. The processing of each block may be executed by one piece of hardware or a plurality of pieces of hardware. The processing of each block may be realized by one program or a plurality of programs.

Further, the processing units of the flowcharts shown in FIGS. 4 to 6 are divided according to the main processing contents in order to facilitate understanding of the operation of the vehicle-mounted device 10, and the present invention is not limited by the division method or name of the processing unit. The processing of the vehicle-mounted device 10 can be divided into more processing units according to the processing content. The processing of the vehicle-mounted device 10 can also be divided so that one processing unit includes more processing. Further, the processing orders of the above flowcharts are not limited to the illustrated examples.

REFERENCE SIGNS LIST 1 vehicle
10 vehicle-mounted device
11 external image capturing camera
12 accelerator sensor
13 brake sensor
14 steering wheel sensor
15 steering angle sensor
16 vehicle speed sensor
17 in-vehicle image capturing camera
20 traveling support ECU
21 CPU
25 memory
26 CAN communication unit
30 traveling support control unit
31 guidance unit
32 line-of-sight detection unit
33 condition determination unit
34 driver state determination unit
35 traveling state determination unit
36 surrounding condition sensing unit
37 operation state sensing unit
38 input receiving unit
39 notification control unit
40 storage unit
41 condition data
50 vehicle control ECU
51 steering 52 accelerator
53 brake
62 speaker
63 input unit
411 first table
412 second table

The invention claimed is:

1. A state determination device for determining a state of a vehicle driver, the state determination device comprising:
a CPU that
    senses that guidance regarding driving operation has been provided to the driver;
    detects a direction of the driver's line-of-sight;
    determines whether a traveling state of the vehicle is traveling in congestion or is in normal traveling which is not traveling in congestion,
    determines whether a gaze condition is satisfied, the gaze condition including:
        that, with respect to a preset a first gaze direction set corresponding to a case in which the traveling state of the vehicle is traveling in congestion or a second gaze direction set corresponding to a case in which the traveling state of the vehicle is in normal traveling, the driver's line-of-sight faces the first or second gaze direction set until a first reference time elapses from when the guidance is sensed; and
        that time during which the driver's line-of-sight faces the first or second gaze direction set is equal to or longer than a second reference time; and
    determines whether the driver is in a state of being able to drive based on the determination result whether or not the first or second gaze condition is satisfied,
    wherein the first gaze direction set corresponding to the case in which the traveling state of the vehicle is traveling in congestion is a smaller number of determination directions than the second gaze direction set corresponding to the case in which the traveling state of the vehicle is in normal traveling, and
    the CPU determines that the driver is in a state of being able to drive when the gaze condition is determined to be satisfied with respect to all of the first and second gaze directions set as targets of determination.

2. The state determination device according to claim 1, wherein the second reference time is set corresponding to the first or second gaze direction set and the traveling state of the vehicle.

3. The state determination device according to claim 1, further comprising:
a memory that stores condition data that determines the first or second gaze direction set and the second reference time in association with the traveling state of the vehicle,
    wherein the CPU makes determination whether or not the gaze condition is satisfied based on the condition data stored in the memory in association with the determined traveling state.

4. The state determination device according to claim 1, further comprising: a touch sensor or a switch that receives input from the driver,
    wherein the CPU senses a situation around the vehicle,
    wherein the CPU determines that the driver is in a state of being able to drive when the gaze condition is determined to be satisfied with respect to the first or second gaze direction set and the input corresponds to the sensed result of the surrounding condition sensing unit.

5. The state determination device according to claim 1, wherein the CPU detects the direction of the driver's line-of-sight or the direction of the driver's face to identify a line-of-sight direction.

6. The state determination device according to claim 1, wherein the CPU senses a voice from a speaker or display guidance of a display for driving start to the driver.

7. A driving support device comprising:
a CPU that
    controls traveling of a vehicle;
    switches between an automatic driving mode in which the CPU performs traveling control and a manual driving mode in which a driver's operation causes the vehicle to travel;
    senses that guidance regarding driving operation has been provided to the driver;
    detects a direction of the driver's line-of-sight;
    determines whether a traveling state of the vehicle is traveling in congestion or is in normal traveling which is not traveling in congestion,
    determines whether a gaze condition is satisfied, the gaze condition including:
        that, with respect to a preset a first gaze direction set corresponding to a case in which the traveling state of the vehicle is traveling in congestion or a second gaze direction set corresponding to a case in which the traveling state of the vehicle is in normal traveling, the driver's line-of-sight faces the first or second gaze direction set until a first reference time elapses from when the guidance is sensed; and
        that time during which the driver's line-of-sight faces the first or second gaze direction set is equal to or longer than a second reference time; and
    determines whether the driver is in a state of being able to drive based on the determination result whether or not the gaze condition is satisfied,
    wherein the first gaze direction set corresponding to the case in which the traveling state of the vehicle is traveling in congestion is a smaller number of determination directions than the second gaze direction set corresponding to the case in which the traveling state of the vehicle is in normal traveling, and
    wherein the CPU determines that the driver is in a state of being able to drive when the gaze condition is determined to be satisfied with respect to all of the first and second gaze directions set as targets of determination, and the CPU switches to the manual driving mode.

8. A state determination method for determining a state of a vehicle driver including a CPU that controls traveling of a vehicle, the state determination method comprising: by the CPU,
    sensing a guidance regarding driving operation has been provided to the driver;
    detecting a direction of a driver's line-of-sight;
    determining whether a traveling state of the vehicle is traveling in congestion or is in normal traveling which is not traveling in congestion,
    determining a condition whether a gaze condition is satisfied, the gaze condition including:
        that, with respect to a preset a first gaze direction set corresponding to a case in which the traveling state of the vehicle is traveling in congestion or a second gaze direction set corresponding to a case in which the traveling state of the vehicle is in normal traveling, the driver's line-of-sight faces the first or second gaze direction set until a first reference time elapses from when guidance is sensed by the step of sensing; and that time during which the driver's line-of-sight faces the first or second gaze direction set is equal to or longer than a second reference time; and determining a driver state whether the driver is in a state of being able to drive based on the determination result of the condition determination step, wherein the first gaze direction set corresponding to the case in which the traveling state of the vehicle is traveling in congestion is a smaller number of determination directions than the second gaze direction set corresponding to the case in which the traveling state of the vehicle is in normal traveling, and the CPU determines that the driver is in a state of being able to drive when the gaze condition is determined to be satisfied with respect to all of the first and second gaze directions set as targets of determination.

9. A driving support method, the method being performed by a vehicle including a CPU that controls traveling of a vehicle, by the CPU, the vehicle being capable of switching between an automatic driving mode in which the CPU performs traveling control and a manual driving mode in which a driver's operation causes the vehicle to travel, wherein:

a state determination is executed by the CPU, the state determination including the steps of sensing a guidance regarding driving operation has been provided to the driver, detecting a direction of a driver's line-of-sight, determining a traveling state whether a traveling state of the vehicle is traveling in congestion or is in normal traveling which is not traveling in congestion, determining a condition whether a gaze condition is satisfied, the gaze condition including that, with respect to a preset a first gaze direction set corresponding to a case in which the traveling state of the vehicle is traveling in congestion or a second gaze direction set corresponding to a case in which the traveling state of the vehicle is in normal traveling, the driver's line-of-sight faces the first or second gaze direction set until a first reference time elapses from when guidance is sensed by the guidance sensing step, and that time during which the driver's line-of-sight faces the first or second gaze direction set is equal to or longer than a second reference time, and determining a driver state whether the driver is in a state of being able to drive based on the determination result of the condition determination step; and wherein the first gaze direction set corresponding to the case in which the traveling state of the vehicle is traveling in congestion is a smaller number of determination directions than the second gaze direction set corresponding to the case in which the traveling state of the vehicle is in normal traveling, the CPU determines that the driver is in a state of being able to drive when the gaze condition is determined to be satisfied with respect to all of the first and second gaze directions set as targets of determination, and when the state determination determines that the driver is in a state of being able to drive, a state of driving operation including steering wheel operation and accelerator operation by the driver is sensed, and switching to the manual driving mode is performed based on the sensed result of the state of driving operation.

* * * * *